(12) United States Patent
Santoso et al.

(10) Patent No.: US 9,249,750 B2
(45) Date of Patent: Feb. 2, 2016

(54) SYSTEM AND METHOD FOR CONTROLLING FUEL INJECTION WHEN AN ENGINE IS AUTOMATICALLY STARTED TO DECREASE AN ENGINE STARTUP PERIOD

(71) Applicant: GM GLOBAL TECHNOLOGY OPERATIONS LLC, Detroit, MI (US)

(72) Inventors: Halim G. Santoso, Novi, MI (US); James R. Yurgil, Livonia, MI (US); Stuart R. Smith, Howell, MI (US); Robert Douglas Shafto, New Hudson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 428 days.

(21) Appl. No.: 13/672,126

(22) Filed: Nov. 8, 2012

(65) Prior Publication Data

US 2014/0129117 A1   May 8, 2014

(51) Int. Cl.
*F02P 15/00* (2006.01)
*F02D 41/30* (2006.01)
*F02D 41/00* (2006.01)
(Continued)

(52) U.S. Cl.
CPC ............... *F02D 41/30* (2013.01); *F02D 37/02* (2013.01); *F02D 41/009* (2013.01); *F02D 41/065* (2013.01); *F02D 41/182* (2013.01); *F02N 11/0814* (2013.01); *F02P 5/045* (2013.01); *F02P 5/1506* (2013.01); *F02D 2041/0092* (2013.01); *F02D 2200/0402* (2013.01); *F02D 2200/0406* (2013.01); *F02D 2200/0414* (2013.01); *Y02T 10/46* (2013.01); *Y02T 10/48* (2013.01)

(58) Field of Classification Search
CPC . F02N 11/0814; F02N 11/0822; Y02T 10/48; F02D 37/02; F02D 41/30
USPC .......................................... 701/101–105, 113
See application file for complete search history.

(56) References Cited

U.S. PATENT DOCUMENTS

| | | | |
|---|---|---|---|
| 4,492,195 A | | 1/1985 | Takahashi et al. |
| 4,495,925 A | * | 1/1985 | Hasegawa ..................... 123/480 |

(Continued)

FOREIGN PATENT DOCUMENTS

| | | |
|---|---|---|
| CN | 1407221 A | 4/2003 |
| CN | 1875186 A | 12/2006 |

(Continued)

OTHER PUBLICATIONS

U.S. Appl. No. 14/559,003, filed Dec. 3, 2014, Shafto et al.

(Continued)

*Primary Examiner* — Thomas Moulis
*Assistant Examiner* — Joseph Dallo

(57) ABSTRACT

A system according to the principles of the present disclosure includes a stop-start module and a fuel control module. The stop-start module stops an engine and thereby interrupts an engine cycle when a driver depresses a brake pedal while an ignition system is on and the engine is idling. The stop-start module restarts the engine when the driver releases the brake pedal. The fuel control module, when the engine is restarted, selectively injects fuel into a cylinder of the engine as the cylinder completes the interrupted engine cycle based on an amount of crankshaft rotation corresponding to a difference between a position of a piston in the cylinder when the piston is stopped and top dead center.

20 Claims, 3 Drawing Sheets

(51) Int. Cl.
*F02D 41/06* (2006.01)
*F02D 41/18* (2006.01)
*F02N 11/08* (2006.01)
*F02P 5/04* (2006.01)
*F02P 5/15* (2006.01)
*F02D 37/02* (2006.01)

(56) References Cited

U.S. PATENT DOCUMENTS

| | | |
|---|---|---|
| 4,958,516 A | 9/1990 | Stiles et al. |
| 5,690,073 A | 11/1997 | Fuwa |
| 5,803,040 A | 9/1998 | Biesinger et al. |
| 6,155,242 A | 12/2000 | Kotwicki et al. |
| 6,202,776 B1 | 3/2001 | Masberg et al. |
| 6,257,207 B1 | 7/2001 | Inui et al. |
| 6,275,759 B1 | 8/2001 | Nakajima et al. |
| 6,513,489 B2 | 2/2003 | Osanai |
| 6,675,088 B2 | 1/2004 | Miki |
| 6,675,768 B2 | 1/2004 | Kanai |
| 6,758,190 B2 | 7/2004 | Denz et al. |
| 6,857,987 B2 | 2/2005 | Aldrich, III et al. |
| 6,910,457 B2 | 6/2005 | Grieser et al. |
| 6,931,318 B2 | 8/2005 | Kaita et al. |
| 6,987,373 B2 | 1/2006 | Kagami et al. |
| 7,027,911 B2 | 4/2006 | Nishikawa et al. |
| 7,079,935 B2 | 7/2006 | Lewis et al. |
| 7,079,941 B2 | 7/2006 | Tetsuno et al. |
| 7,082,930 B2 | 8/2006 | Liller et al. |
| 7,130,731 B2 | 10/2006 | Itoh et al. |
| 7,146,960 B2 | 12/2006 | Phlips et al. |
| 7,159,571 B2 | 1/2007 | Kassner |
| 7,177,755 B2 | 2/2007 | Nishikawa et al. |
| 7,204,226 B2 | 4/2007 | Zillmer et al. |
| 7,275,509 B2 | 10/2007 | Kassner |
| 7,331,320 B2 | 2/2008 | Asada |
| 7,559,304 B2 | 7/2009 | Kataoka et al. |
| 7,587,270 B2 | 9/2009 | Tabata et al. |
| 7,614,377 B2 | 11/2009 | Noguchi |
| 7,664,594 B2 | 2/2010 | Kojima |
| 7,681,545 B2 | 3/2010 | Taki et al. |
| 7,809,493 B2 | 10/2010 | Adachi |
| 7,827,975 B1 | 11/2010 | Gibson et al. |
| 7,848,875 B2 | 12/2010 | Nakai |
| 7,931,002 B1 | 4/2011 | Gibson et al. |
| 8,099,203 B2 * | 1/2012 | Miller et al. ............. 701/22 |
| 8,140,247 B2 | 3/2012 | Gibson et al. |
| 8,141,533 B2 | 3/2012 | Demura |
| 8,157,035 B2 | 4/2012 | Whitney et al. |
| 8,214,112 B2 | 7/2012 | Rew et al. |
| 8,240,297 B2 | 8/2012 | Gibson et al. |
| 8,290,693 B2 | 10/2012 | Shoda et al. |
| 8,408,176 B2 * | 4/2013 | Pursifull et al. ......... 123/179.16 |
| 8,442,747 B2 | 5/2013 | Ma et al. |
| 8,543,318 B2 | 9/2013 | Ma et al. |
| 8,635,987 B2 | 1/2014 | Ma et al. |
| 8,812,221 B2 | 8/2014 | Hozumi et al. |
| 8,855,896 B2 | 10/2014 | Ma et al. |
| 8,892,339 B2 | 11/2014 | Ma et al. |
| 8,972,150 B2 * | 3/2015 | Ma et al. ............. 701/103 |
| 2004/0000281 A1 | 1/2004 | Wakitani et al. |
| 2004/0084002 A1 | 5/2004 | Mitsutani et al. |
| 2004/0153236 A1 | 8/2004 | Itoh et al. |
| 2005/0109302 A1* | 5/2005 | Tetsuno et al. ............. 123/179.5 |
| 2005/0221952 A1* | 10/2005 | Tetsuno et al. ............. 477/115 |
| 2006/0048734 A1 | 3/2006 | Kataoka et al. |
| 2006/0218923 A1 | 10/2006 | Sopko et al. |
| 2007/0062476 A1 | 3/2007 | Ota et al. |
| 2007/0084429 A1 | 4/2007 | Taki et al. |
| 2007/0163531 A1 | 7/2007 | Lewis et al. |
| 2007/0261668 A1 | 11/2007 | Kataoka et al. |
| 2008/0066706 A1* | 3/2008 | Nakamura et al. ......... 123/179.4 |
| 2008/0091328 A1* | 4/2008 | Tabata et al. ............. 701/102 |
| 2008/0275624 A1 | 11/2008 | Snyder |
| 2009/0037085 A1* | 2/2009 | Kojima ............. F02N 11/0844 701/113 |
| 2009/0066337 A1 | 3/2009 | Gibson et al. |
| 2009/0299586 A1 | 12/2009 | Miller et al. |
| 2010/0038158 A1 | 2/2010 | Whitney et al. |
| 2010/0114461 A1 | 5/2010 | Gibson |
| 2010/0114462 A1 | 5/2010 | Gibson et al. |
| 2010/0174473 A1 | 7/2010 | Pursifull et al. |
| 2010/0211299 A1 | 8/2010 | Lewis et al. |
| 2011/0146609 A1 | 6/2011 | Enoki |
| 2011/0295489 A1 | 12/2011 | Ma et al. |
| 2012/0132163 A1* | 5/2012 | Shoji et al. ............. 123/90.16 |
| 2012/0192826 A1 | 8/2012 | Shafto |
| 2012/0245831 A1 | 9/2012 | Patterson et al. |
| 2013/0000599 A1* | 1/2013 | Okamoto et al. ............. 123/295 |
| 2013/0066540 A1 | 3/2013 | Lewis et al. |
| 2013/0080039 A1* | 3/2013 | Nakamoto et al. ............. 701/113 |
| 2013/0096811 A1* | 4/2013 | Yamauchi et al. ............. 701/112 |
| 2013/0138328 A1* | 5/2013 | Shimo et al. ............. 701/104 |
| 2013/0304362 A1 | 11/2013 | Santoso et al. |
| 2014/0129117 A1 | 5/2014 | Santoso et al. |

FOREIGN PATENT DOCUMENTS

| | | |
|---|---|---|
| CN | 1912370 A | 2/2007 |
| CN | 101598214 A | 12/2009 |
| CN | 101680414 A | 3/2010 |
| CN | 101900045 A | 12/2010 |
| CN | 102269073 A | 12/2011 |
| DE | 102005049092 A1 | 4/2007 |
| JP | 02081939 A | 3/1990 |
| JP | 2009-062960 A | 3/2009 |

OTHER PUBLICATIONS

Ohata et al., "Benchmark Problem for Automotive Engine Control", SICE Annual Conference, Sep. 2007, pp. 1723-1726.
Rokusho et al., "Combined Feedforward and Feedback Control for Start-Up Engine Control", 27th Chinese Control Conference, Jul. 2008, pp. 562-565.
Zhang et al., "Model-Based Cold-Start Speed Control Design for SI Engines", Proceedings of the 17th World Congress of the International Federation of Automatic Control, Jul. 2008, pp. 1042-1047.
Saerens et al., "Minimization of the Fuel Consumption of a Gasoline Engine Using Dynamic Optimization", Applied Energy, vol. 86 Iss. 9, Sep. 2009, pp. 1582-1588.
Rajamani, "Vehicle Dynamics and Control", 2006, pp. 111-117.
U.S. Appl. No. 13/470,874, filed May 14, 2012, Santoso et al.

* cited by examiner

SYSTEM AND METHOD FOR CONTROLLING FUEL INJECTION WHEN AN ENGINE IS AUTOMATICALLY STARTED TO DECREASE AN ENGINE STARTUP PERIOD

FIELD

The present disclosure relates to systems and methods for controlling fuel injection when an engine is automatically started to decrease an engine startup period.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

A system according to the principles of the present disclosure includes a stop-start module and a fuel control module. The stop-start module stops an engine and thereby interrupts an engine cycle when a driver depresses a brake pedal while an ignition system is on and the engine is idling. The stop-start module restarts the engine when the driver releases the brake pedal. The fuel control module, when the engine is restarted, selectively injects fuel into a cylinder of the engine as the cylinder completes the interrupted engine cycle based on an amount of crankshaft rotation corresponding to a difference between a position of a piston in the cylinder when the piston is stopped and top dead center.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An engine control system may automatically shut down an engine when the engine is idling to reduce fuel consumption and emissions. The engine control system may automatically shut down the engine when a driver depresses a brake pedal and vehicle speed is zero. The engine control system may automatically restart the engine when the driver releases the brake pedal after the engine is automatically shut down.

An engine control system may automatically shut down an engine when a piston in a cylinder of the engine is completing a compression stroke. Subsequently, when the engine is restarted, the engine control system may not inject fuel into the cylinder or generate spark in the cylinder while the piston completes the interrupted compression stroke. Instead, the engine control system may wait until the next full compression stroke to inject fuel into the cylinder and generate spark in the cylinder.

Waiting until the next full compression stroke to inject fuel and generate spark increases the automatic restart period. In addition, vehicle vibration may be more perceptible to the driver since the relatively high cranking speed required for an automatic restart has more time to strike the resonance frequency of a vehicle body. Furthermore, since the air within the cylinder is heated by surrounding engine components while the engine is shutdown, the air/fuel mixture within the cylinder may automatically ignite (i.e., ignite without spark) during the next full compression stroke.

An engine control system according to the principles of the present disclosure detects a piston stopping position during an automatic shutdown and determines when to inject fuel during a subsequent restart based on the piston stopping position. If the piston stopping position indicates that there is enough air in the cylinder to achieve a target engine speed, the engine control system injects fuel and generates spark during the interrupted engine cycle. If the piston stopping position indicates that the amount of air in the cylinder is insufficient to achieve the target engine speed, the engine control system waits until the next full compression stroke to inject fuel and generate spark.

Injecting fuel and generating spark before the next full compression stroke decreases the period required to automatically restart the engine. In addition, vehicle vibration may be less perceptible to the driver since the relatively high cranking speed required for an automatic startup will have less time to strike the resonance frequency of a vehicle body. Furthermore, generating spark before the next full compression stroke ensures that the air/fuel mixture within the cylinder does not automatically ignite.

Figure 1:
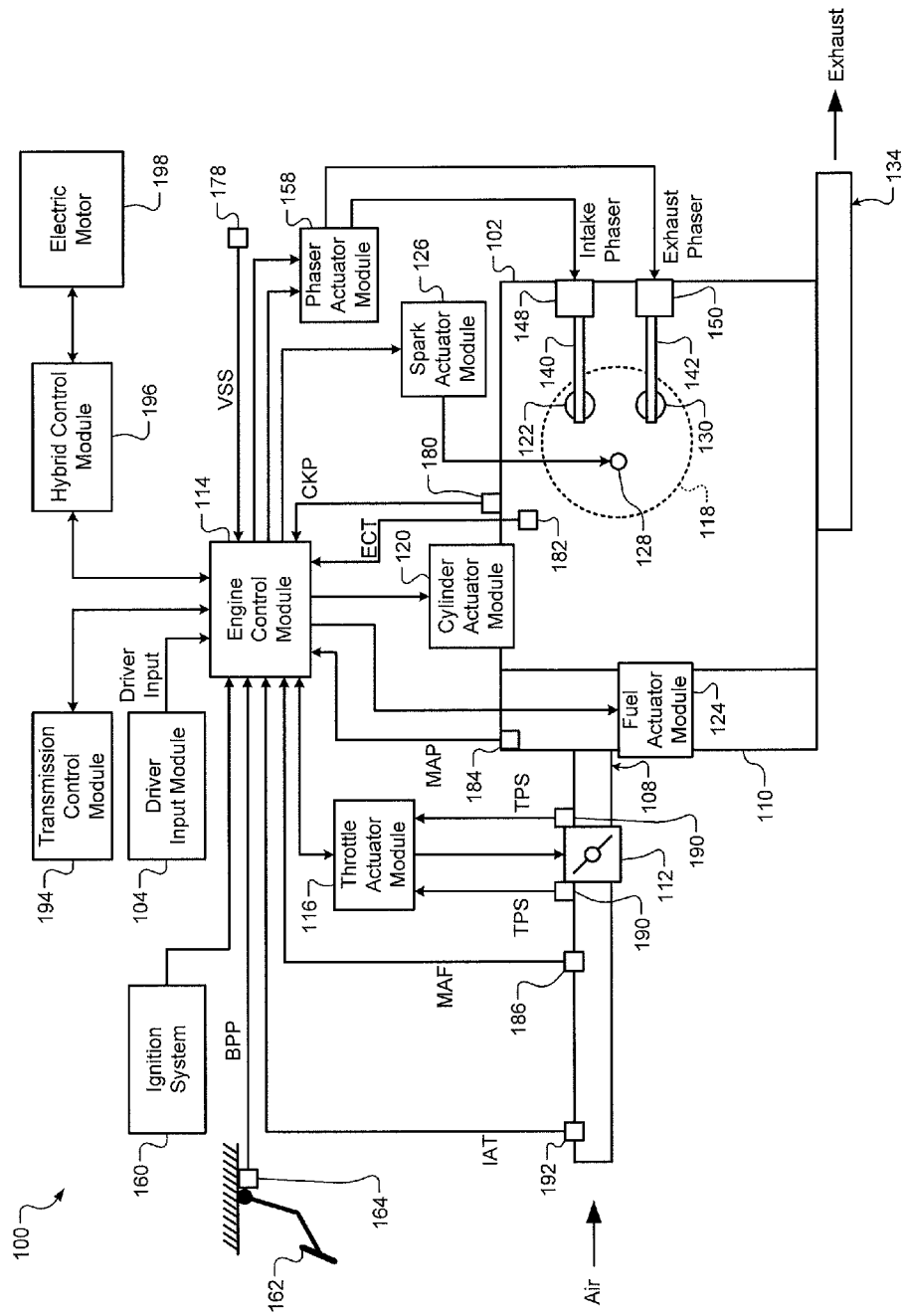
FIG. 1 is a functional block diagram of an example engine system according to the principles of the present disclosure.

Referring to FIG. 1, an engine system 100 includes an engine 102 that combusts an air/fuel mixture to produce drive torque for a vehicle based on driver input from a driver input module 104. The driver input may be based on a position of an accelerator pedal. The driver input may also be based on cruise control, which may be an adaptive cruise control system that varies vehicle speed to maintain a predetermined following distance.

Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The ECM 114 may start the engine 102 and stop the engine 102 based on input received from an ignition system 160. The ignition system 160 may include a key or a button. The ECM 114 may start the engine 102 when a driver turns the key from an off position to an on position or when the driver presses the button. The ECM 114 may stop the engine 102 when a driver turns the key from the on position to the off position or when the driver presses the button while the engine 102 is running.

A driver may depress a brake pedal 162 to decelerate and/or stop the vehicle. The engine system 100 may measure the position of the brake pedal 162 using a brake pedal position (BPP) sensor 164. The ECM 114 may determine when the brake pedal 162 is depressed or released based on input received from the BPP sensor 164 and/or based on input received from a brake line pressure sensor (not shown).

The engine system 100 may measure the speed of the vehicle using a vehicle speed sensor (VSS) 178. The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

The ECM 114 may determine engine speed based on input received from the CKP sensor 180. The CKP sensor 180 may include a Hall effect sensor, an optical sensor, an inductor sensor, and/or another suitable type of sensor positioned adjacent to a disk having N teeth (e.g., 58 teeth). The disk may rotate with the crankshaft while the sensor remains stationary. The sensor may detect when the teeth pass by the sensor. The ECM 114 may determine the engine speed based on an amount of crankshaft rotation between tooth detections and a period between the tooth detections.

The CKP sensor 180 may include a bidirectional crankshaft sensor that detects the direction in which the teeth are traveling as the teeth pass by the sensor. Thus, the CKP sensor 180 can detect crankshaft position and the direction of crankshaft rotation. The ECM 114 may determine when the direction of crankshaft rotation is reversed based on input received from the CKP sensor 180.

The ECM 114 may automatically shut down the engine 102 when the engine 102 is idling to reduce fuel consumption and emissions. The ECM 114 may shut down the engine 102 when the vehicle speed is less than or equal to a predetermined speed (e.g., zero) and the driver depresses the brake pedal 162. The ECM 114 may automatically restart the engine 102 when the driver releases the brake pedal 162.

The ECM 114 may automatically shut down the engine 102 while the piston in the cylinder 118 is completing a compression stroke. When the ECM 114 restarts the engine 102, the ECM 114 may inject fuel into the cylinder 118 as the piston completes the compression stroke when there is enough air in the cylinder 118 to achieve a target engine speed. The ECM 114 may determine the amount of air in the cylinder 118 based on a position of the piston when the piston is stopped during engine shutdown.

Figure 2:
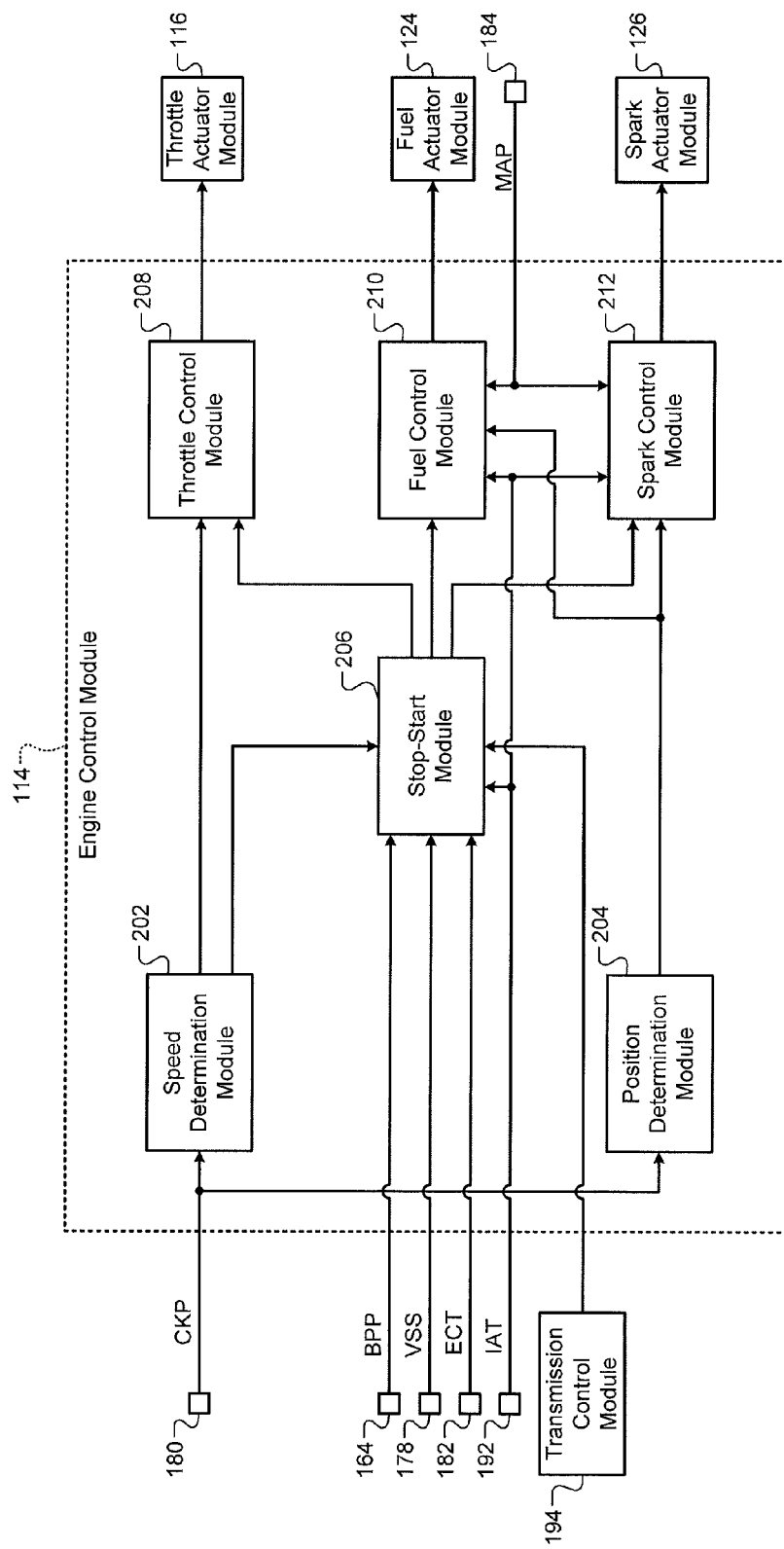
FIG. 2 is a functional block diagram of an example control system according to the principles of the present disclosure.

Referring to FIG. 2, an example implementation of the ECM 114 includes a speed determination module 202, a position determination module 204, and a stop-start module 206. The speed determination module 202 determines engine speed. The speed determination module 202 may determine engine speed based on input received from the CKP sensor 180. The speed determination module 202 may determine engine speed based on an amount of crankshaft rotation between tooth detections and the corresponding period. The speed determination module 202 outputs the engine speed.

The position determination module 204 determines the position of the piston in the cylinder 118. The position determination module 204 may determine the piston position based on input received from the CKP sensor 180. If the engine 102 includes multiple cylinders, the position determination module 204 may determine the positions of the pistons in the cylinders based on input received from the CKP sensor 180. The position determination module 204 may determine the piston position(s) based on a predetermined relationship between the crankshaft position and the piston position(s). The position determination module 204 outputs the piston position(s).

The stop-start module 206 automatically stops and restarts the engine 102 when the engine 102 is idling. The stop-start module 206 may automatically stop the engine 102 when the vehicle speed is less than or equal to a predetermined speed (e.g., zero) and the driver depresses the brake pedal 162. The stop-start module 206 may automatically restart the engine 102 when the driver releases the brake pedal 162. The stop-start module 206 may receive the vehicle speed from the VSS sensor 178. The stop-start module 206 may determine when the driver depresses or releases the accelerator pedal based on input received from the BPP sensor 164.

The stop-start module 206 may ensure that additional conditions are satisfied before automatically stopping the engine 102. For example, the stop-start module 206 may ensure that the engine coolant temperature is greater than a first temperature, a transmission oil temperature is greater than a second temperature, and ambient air temperature is within a temperature range. The first temperature, the second temperature, and the temperature range may be predetermined.

The stop-start module 206 may receive the engine coolant temperature from the ECT sensor 182. The stop-start module 206 may estimate the ambient air temperature based on the intake air temperature. The stop-start module 206 may receive the intake air temperature from the IAT sensor 192. The stop-start module 206 may receive the transmission oil temperature from the transmission control module 194 and/or a transmission oil temperature sensor (not shown).

The stop-start module 206 may automatically stop and restart the engine 102 by sending signals to a throttle control module 208, a fuel control module 210, and/or a spark control module 212. The throttle control module 208 may stop or start the engine 102 by instructing the throttle actuator module 116 to close or open the throttle valve 112. The fuel control module 210 may stop or start the engine 102 by instructing the fuel actuator module 124 to stop or start providing fuel to the cylinder 118. The spark control module 212 may stop or start the engine 102 by instructing the spark actuator module 126 to stop or start providing spark to the cylinder 118.

When the engine 102 is restarted, the fuel control module 210 determines when to provide fuel and the spark control module 212 determines when to provide spark based on the position of the piston in the cylinder 118 when the piston is stopped. The fuel control module 210 and the spark control module 212 receive the piston stopping position from the position determination module 204. The piston stopping position may be specified as the number of degrees before the piston reaches TDC.

If the piston stopping position is greater than a first angle, the fuel control module 210 and the spark control module 212 provide fuel and spark, respectively, during the compression stroke of the present engine cycle. If the crank angle corresponding to the piston stopping position is less than or equal to the first angle, the fuel control module 210 and the spark control module 212 wait until the next full compression stroke to provide fuel and spark to the cylinder 118. The first angle may be a predetermined value (e.g., 90 degrees) and/or within a predetermined range (e.g., between 60 degrees and 110 degrees).

The fuel control module 210 may provide fuel to the cylinder 118 during the compression stroke of the present engine cycle when an amount of air drawn into the cylinder 118 during the compression stroke is sufficient to achieve a target engine speed. The torque output of an engine is a function of the amount of air drawn into the cylinders of the engine. When a sufficient amount of air is drawn into the cylinders, the torque output of the engine may be controlled to adjust the engine speed by adjusting the amount of fuel injected into the cylinders, injection timing, and spark timing.

The amount of air drawn into the cylinder 118 may be determined based on the cylinder volume when the piston is stopped. The cylinder volume when the piston is stopped may be determined based on the piston stopping position and the engine geometry. The amount of air drawn into the cylinder 118 may be sufficient to achieve the target engine speed when the piston stopping position is greater than the first angle. In this regard, the first angle may be adjusted based on the target engine speed.

If the amount of air drawn into the cylinder 118 is sufficient, the fuel control module 210 may determine an injection amount and injection timing based on an amount of air trapped in the cylinder 118 and a compression ratio of the cylinder 118. The fuel control module 210 may estimate the trapped air mass based on the piston stopping position, the engine geometry, the intake air temperature, and/or the manifold pressure. The fuel control module 210 may estimate the compression ratio of the cylinder based on valve timing and a ratio of the cylinder volume when the piston is stopped to the cylinder volume when the piston in the cylinder 118 is at TDC. As discussed above, the cylinder volume when the piston is stopped may be determined based on the piston stopping position and the engine geometry.

When providing spark to the cylinder 118 during the compression stroke of the present engine cycle, the spark control module 212 may determine spark timing based on the piston stopping position using, for example, a lookup table. The spark control module 212 may also determine spark timing based on the period that the engine 102 is shutdown, the manifold pressure, and/or the intake air temperature.

Figure 3:
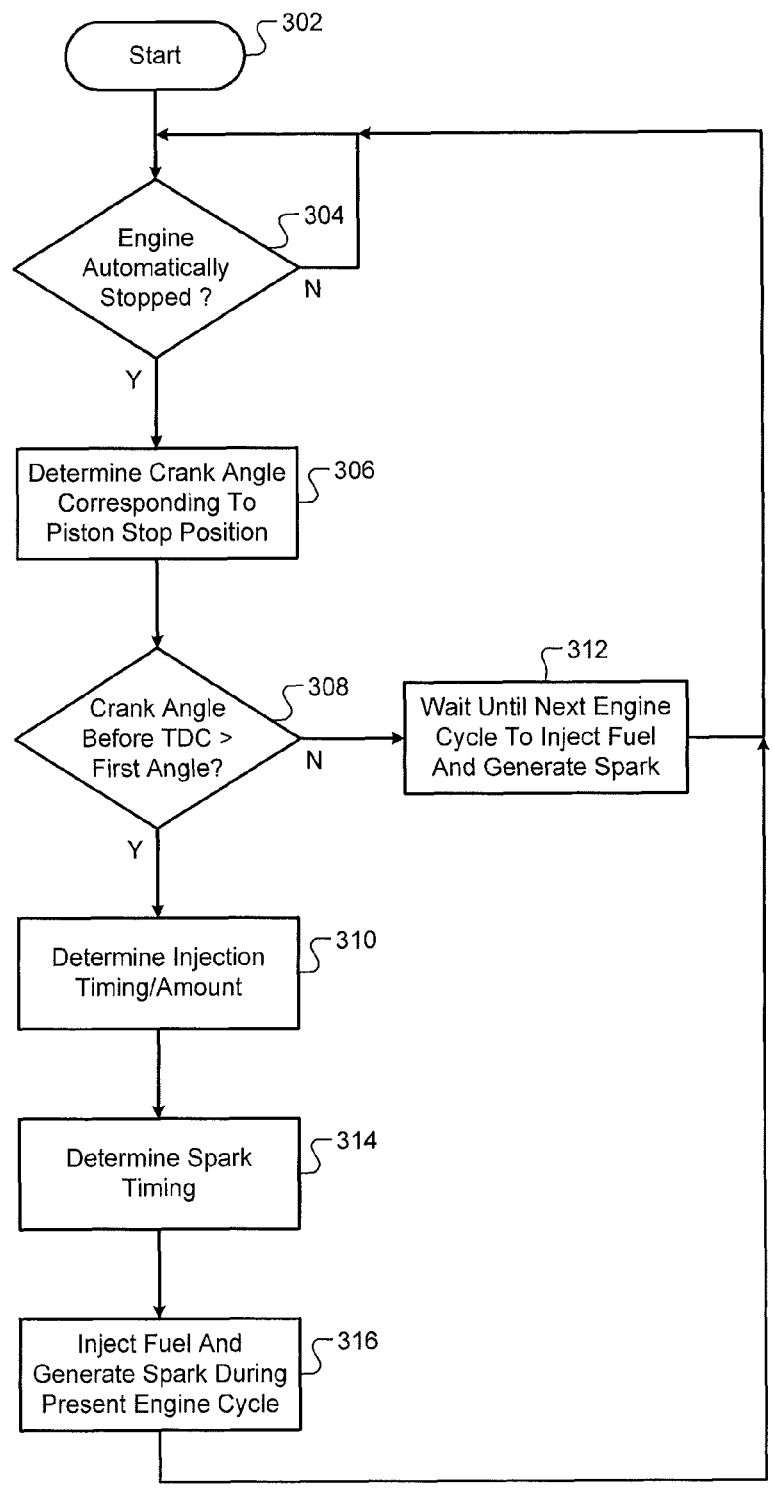
FIG. 3 is a flowchart illustrating an example control method according to the principles of the present disclosure.

Referring to FIG. 3, a method for improving an automatic startup period of an engine begins at 302. At 304, the method determines whether an engine is automatically stopped. If the engine is automatically stopped, the method continues at 306. Otherwise, the method continues at 308. At 306, the method determines a crank angle corresponding to a position of a piston in a cylinder of the engine when the piston is stopped. The crank angle may be specified as a number of degrees before the piston reaches its topmost position, referred to as top dead center (TDC).

At 308, the method determines whether the crank angle corresponding to the piston stopping position is greater than a first angle. The first angle may be a predetermined value (e.g., 90 degrees) and/or within a predetermined range (e.g., between 60 degrees and 110 degrees). If the crank angle is greater than the first angle, the method continues at 310. Otherwise, the method continues at 312.

At 310, the method determines an amount of fuel to inject into the cylinder or into an injection port associated with the cylinder. In addition, the method determines injection timing (i.e., when to start and/or stop injecting fuel into the cylinder or the injection port). The method may determine the injection timing and amount based on the crank angle corresponding to the piston stopping position using, for example, a lookup table.

To prevent the cylinder from auto-igniting, the method may apply a multiplier to the injection amount based on the propensity of the engine to auto-ignite. The multiplier may be within a predetermined range (e.g., between 1 and 2). Thus, applying the multiplier may increase the injection amount, which may cool the air/fuel mixture within the cylinder.

At 314, the method determines spark timing (i.e., when to generate spark in the cylinder). The method may determine spark timing based on the crank angle corresponding to the piston stopping position using, for example, a lookup table.

At 316, the method injects fuel and generates spark during the present engine cycle. For example, the method may inject fuel and generate spark during a compression stroke of the present engine cycle, even if the compression stroke is already in progress. At 312, the method waits until the next engine cycle to generate spark in the cylinder and inject fuel into the cylinder or into an injection port associated with the cylinder.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A system comprising:
   a stop-start module that stops an engine and thereby interrupts a compression stroke of a cylinder in the engine when a driver depresses a brake pedal while an ignition system is on and the engine is idling, and that restarts the engine when the driver releases the brake pedal;
   a fuel control module that, when the engine is restarted, selectively injects fuel into the cylinder as the cylinder completes the interrupted compression stroke based on an amount of crankshaft rotation corresponding to a difference between a position of a piston in the cylinder when the piston is stopped and top dead center; and a spark control module that, when the engine is restarted, selectively generates spark in the cylinder as the cylinder completes the interrupted compression stroke based on the amount of crankshaft rotation.

2. The system of claim 1 wherein the fuel control module injects fuel into the cylinder during the interrupted compression stroke when the amount of crankshaft rotation is greater than a first angle.

3. The system of claim 2 wherein the fuel control module determines an injection amount and injection timing based on the amount of crankshaft rotation.

4. The system of claim 3 wherein the fuel control module applies a multiplier to the injection amount that is based on a propensity of the engine to automatically ignite, wherein the multiplier is greater than one.

5. The system of claim 2 wherein the fuel control module determines an injection amount and injection timing based on a compression ratio of the cylinder and an amount of air trapped within the cylinder when the engine is shut down.

6. The system of claim 5 wherein the fuel control module estimates the trapped air amount based on the piston stopping position, engine geometry, an intake air temperature, and a manifold pressure, and the fuel control module estimates the compression ratio based on valve timing and a ratio of a first volume of the cylinder at the piston stopping position to a second volume of the cylinder at top dead center.

7. The system of claim 1 wherein the spark control module generates spark in the cylinder during the interrupted compression stroke when the amount of crankshaft rotation is greater than a first angle.

8. The system of claim 7 wherein the spark control module determines spark timing based on the piston stopping position.

9. The system of claim 8 wherein the spark control module determines the spark timing further based on at least one of an engine shutdown period, a manifold pressure, and an intake air temperature.

10. A method comprising:
stopping an engine and thereby interrupting a compression stroke of a cylinder in the engine when a driver depresses a brake pedal while an ignition system is on and the engine is idling;
restarting the engine when the driver releases the brake pedal;
when the engine is restarted, selectively injecting fuel into the cylinder as the cylinder completes the interrupted compression stroke based on an amount of crankshaft rotation corresponding to a difference between a position of a piston in the cylinder when the piston is stopped and top dead center; and
when the engine is restarted, selectively generating spark in the cylinder as the cylinder completes the interrupted compression stroke based on the amount of crankshaft rotation.

11. The method of claim 10 further comprising injecting fuel into the cylinder during the interrupted compression stroke when the amount of crankshaft rotation is greater than a first angle.

12. The method of claim 11 further comprising determining an injection amount and injection timing based on the amount of crankshaft rotation.

13. The method of claim 12 further comprising applying a multiplier to the injection amount that is based on a propensity of the engine to automatically ignite, wherein the multiplier is greater than one.

14. The method of claim 11 further comprising determining an injection amount and injection timing based on a compression ratio of the cylinder and an amount of air trapped within the cylinder when the engine is shut down.

15. The method of claim 14 further comprising:
estimating the trapped air amount based on the piston stopping position, engine geometry, an intake air temperature, and a manifold pressure; and
estimating the compression ratio based on valve timing and a ratio of a first volume of the cylinder at the piston stopping position to a second volume of the cylinder at top dead center.

16. The method of claim 10 further comprising generating spark in the cylinder during the interrupted compression stroke when the amount of crankshaft rotation is greater than a first angle.

17. The method of claim 16 further comprising determining spark timing based on the piston stopping position.

18. The method of claim 17 further comprising determining the spark timing further based on at least one of an engine shutdown period, a manifold pressure, and an intake air temperature.

19. The system of claim 2 wherein the fuel control module adjusts the first angle based on a target engine speed.

20. The method of claim 11 further comprising adjusting the first angle based on a target engine speed.

* * * * *